United States Patent
Liden

(10) Patent No.: US 10,405,059 B2
(45) Date of Patent: *Sep. 3, 2019

(54) MEDIUM, SYSTEM, AND METHOD FOR IDENTIFYING COLLECTIONS ASSOCIATED WITH SUBJECTS APPEARING IN A BROADCAST

(71) Applicant: IMDB.com, Inc., Seattle, WA (US)

(72) Inventor: Lars Hasso Liden, Seattle, WA (US)

(73) Assignee: IMDB. COM, INC., Seattle, WA (US)

(\*) Notice: Subject to any disclaimer, the term of this patent is extended or adjusted under 35 U.S.C. 154(b) by 642 days.

This patent is subject to a terminal disclaimer.

(21) Appl. No.: 15/077,022

(22) Filed: Mar. 22, 2016

(65) Prior Publication Data

US 2016/0205447 A1    Jul. 14, 2016

Related U.S. Application Data

(63) Continuation of application No. 13/732,753, filed on Jan. 2, 2013, now Pat. No. 9,317,879.

(51) Int. Cl.

| | | |
|---|---|---|
| *G06Q 30/00* | (2012.01) |
| *H04N 21/81* | (2011.01) |
| *G06Q 30/06* | (2012.01) |
| *H04N 21/2668* | (2011.01) |
| *H04N 21/44* | (2011.01) |
| *H04N 21/4725* | (2011.01) |
| *H04N 21/478* | (2011.01) |

(Continued)

(52) U.S. Cl.
CPC ..... *H04N 21/8133* (2013.01); *G06Q 30/0623* (2013.01); *G06Q 30/0633* (2013.01); *G06Q 30/0643* (2013.01); *H04N 21/2668* (2013.01); *H04N 21/44008* (2013.01); *H04N 21/4725* (2013.01); *H04N 21/47815* (2013.01); *H04N 21/812* (2013.01); *G06F 3/147* (2013.01); *H04N 5/44591* (2013.01)

(58) Field of Classification Search
CPC .............................. G06Q 30/0641; G06T 7/00
USPC .......................................... 705/27.1; 382/100
See application file for complete search history.

(56) References Cited

U.S. PATENT DOCUMENTS

| | | |
|---|---|---|
| 6,587,835 B1 | 7/2003 | Treyz et al. |
| 8,416,981 B2 | 4/2013 | Vanhoucke et al. |

(Continued)

OTHER PUBLICATIONS

Vufind Launches Unique Photo/Video Tagging and Visual Social Networking App for iPhone, Nov. 22, 2010, PR Newswire (Year: 2010).*

(Continued)

*Primary Examiner* — Brittney N Miller
(74) *Attorney, Agent, or Firm* — Thomas | Horstemeyer, LLP

(57) ABSTRACT

Disclosed are various embodiments for presenting collections of items related to subjects in a performance to viewers. The collections are assumed to be identified prior to the performance by individuals with knowledge of subjects expected to appear in the performance. The subject's appearance may be detected based on a user input indicating the appearance or by a subject recognition algorithm. The collections may be presented to a customer in a display also rendering the performance or in a separate display. The customer may select the collections and/or items therein for performing an action with the item, such as, for example purchasing the item.

20 Claims, 10 Drawing Sheets

(51) Int. Cl.
*G06F 3/147* (2006.01)
*H04N 5/445* (2011.01)

(56) References Cited

U.S. PATENT DOCUMENTS

| | | |
|---|---|---|
| 2006/0150218 A1 | 7/2006 | Lazar et al. |
| 2007/0136247 A1 | 6/2007 | Vigil |
| 2007/0240190 A1 | 10/2007 | Arseneau et al. |
| 2010/0060802 A1 | 3/2010 | Huegel |
| 2010/0061701 A1 | 3/2010 | Iwane |
| 2010/0123830 A1 | 5/2010 | Vunic |
| 2010/0218211 A1 | 8/2010 | Herigstad et al. |
| 2010/0306805 A1* | 12/2010 | Neumeier .......... H04N 5/44591 725/60 |
| 2012/0210349 A1 | 8/2012 | Campana |
| 2012/0238254 A1* | 9/2012 | Yankovich ............ H04L 65/602 455/414.2 |
| 2013/0083999 A1* | 4/2013 | Bhardwaj .......... G06Q 30/0643 382/165 |
| 2013/0205335 A1 | 8/2013 | Ballai et al. |

OTHER PUBLICATIONS

Opinion: Content Discovery in the connected TV market will rely on new forms of recommendations, (Apr. 30, 2012), New Media Age (On-line), Retrieved from http://search.proquest.com/docview/101281889?accountid=14753.

Dress on the Paris Stage, (Jun. 2, 1901), Los Angeles Times (1886-1922) Retrieved from http://search.proquest.com/docview/164035721?accountid=14753.

* cited by examiner

MEDIUM, SYSTEM, AND METHOD FOR IDENTIFYING COLLECTIONS ASSOCIATED WITH SUBJECTS APPEARING IN A BROADCAST

CROSS-REFERENCE TO RELATED APPLICATIONS

This application is a continuation of and claims priority to U.S. application Ser. No. 13/732,753 titled "ASSOCIATING COLLECTIONS WITH SUBJECTS", filed Jan. 2, 2013, which is incorporated herein by reference in its entirety.

BACKGROUND

Performances often inspire viewers to purchase items seen in the performance. Individuals may encounter difficulty identifying these items or similar items. Manufacturers of the items may want to present the viewer with collections of the items or similar items, but may not be able to do this during the performance.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
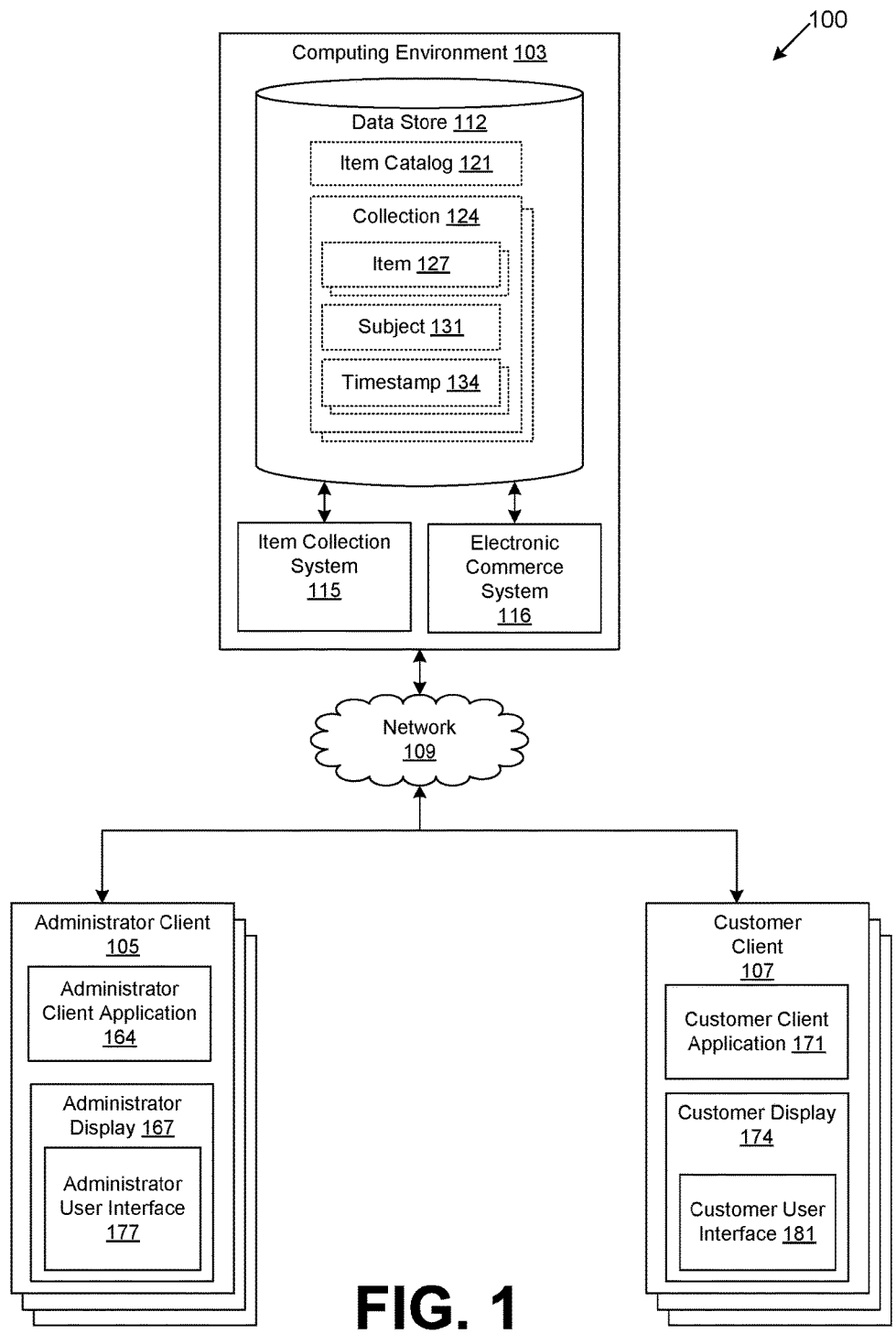
FIG. 1 is a drawing of a networked environment according to various embodiments of the present disclosure.

Individuals often view performances. For example, individuals watch awards shows, movies, commercials, television shows, and other events. Performances may be observed through a device or in person. These performances depict subjects, such as, for example, people, structures, animals, vehicles, rooms, buildings, and other subjects. These subjects are often associated with items. For example, an actress in an awards performance may be wearing items such as a necklace, earrings, and a dress. Another example of items associated with a subject may be furniture seen in a room during a performance. The items may be available for purchase. For instance, clothing, jewelry, accessories, furniture, paint, décor, and other items may be purchased through an electronic commerce system. The present disclosure relates to displaying collections of items associated with subjects to customers when the subject appears in a performance to facilitate purchase of such items or to provide information with the electronic commerce system 116 with respect to such items as will be described.

Various embodiments of the present disclosure enable associating collections of items with subjects in performances by defining the collection before the performance. The collection may be defined by an individual with knowledge of the subjects that will appear and the items that will be associated with the respective subjects. For example, a merchant may know that an actress will wear certain jewelry in an awards show or a representative may know that a newscaster will wear a certain suit during the newscast. Such items may be included in collections that may be stored in a data store. During a performance, upon an indication that the subject has appeared in the performance, the collection may be presented to the user. For example, a user may click a button indicating that the actress has appeared in the awards show. Or the actress may have been detected by automated subject recognition.

In various embodiments, the user may view the performance in person or through a device. For example, the user may be an attendee at the awards show or may be viewing the awards show through a television or other device capable of displaying performances. In various embodiments, both the user at the administrator client and the user at the customer client may be present at the performance, only one of them may be present while the other observes the performance remotely through a device, or neither may be present at the performance.

The collection may then be added to a user interface rendered for a customer watching the awards show where the customer may click on the collections and/or items in the collection to perform some action, such as, for example, purchase the collection and/or items. Furthermore, a time, such as, for example, timestamp since the beginning of the performance, of when the subject appeared may be stored so that the collection may be presented to the user upon appearance of the subject when a recorded version of the performance is replayed in the future.

In the following discussion, a general description of the system and its components is provided, followed by a discussion of the operation of the same.

With reference to FIG. 1, shown is a networked environment 100 according to various embodiments. The networked environment 100 includes a computing environment 103, an administrator client device 105, and customer client device 107, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include the item collection system 115, an electronic commerce system 116, and other applications, services, processes, systems, engines, or functionality not discussed in detail herein. The item collection system 115 is executed to associate collections of items with subjects viewed in performances.

The electronic commerce system 116 is executed to facilitate the purchase of items over network 109. The electronic commerce system 116 also performs various backend functions associated with the online presence of a merchant or electronic marketplace to facilitate the online purchase of items. For example, the electronic commerce system 116 may generate network pages or portions thereof that are provided to the administrator client 105 and/or the customer client 107 for the purposes of selecting items for purchase, rental, download, lease, or other forms of consumption.

The data stored in the data store 112 includes, for example, item catalog 121, collections 124, and potentially other data. Each collection 124 may include data related to collections of items seen in performances. For example, a collection 124 may include one or more items 127, a subject 131 associated with the collection 124, and one or more timestamps 134 when the subject was observed in the performance. Each timestamp 134 may be a time that associates the collection 124 with the performance when the subject 131 appeared. If the subject appears multiple times in the performance, multiple timestamps 134 may be stored.

The item catalog 121 contains various data regarding items in a catalog. Such items may correspond to products, goods, services, downloads, and so on, which may be offered for order by one or more merchants by way of an electronic commerce system. The various data regarding each item may include name, description, price, genre, subgenre, categories, images, videos, tax categories, options, shipping categories, and so on.

The administrator client 105 is representative of a plurality of client devices that may be coupled to the network 109. The administrator client 105 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The administrator client 105 may include an administrator display 167. The administrator display 167 may comprise, for example, one or more devices such as liquid crystal display (LCD) displays, gas plasma-based flat panel displays, organic light emitting diode (OLED) displays, LCD projectors, or other types of display devices, etc.

The administrator client 105 may be configured to execute various applications such as an administrator client application 164 and/or other applications. The administrator client application 164 may be executed in an administrator client 105, for example, to access network content served up by the computing environment 103 and/or other servers, thereby rendering an administrator user interface 177 on the administrator display 167. To this end, the administrator client application 164 may comprise, for example, a browser, a dedicated application, etc., and the administrator user interface 177 may comprise a network page, an application screen, etc. The administrator client 105 may be configured to execute applications beyond the administrator client 105 such as, for example, email applications, social networking applications, word processors, spreadsheets, and/or other applications.

The customer client 107 is representative of a plurality of client devices that may be coupled to the network 109. The customer client 107 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The customer client 107 may include a customer display 174. The customer display 174 may comprise, for example, one or more devices such as liquid crystal display (LCD) displays, gas plasma-based flat panel displays, organic light emitting diode (OLED) displays, LCD projectors, or other types of display devices, etc.

The customer client 107 may be configured to execute various applications such as a customer client application 171 and/or other applications. The customer client application 171 may be executed in a customer client 107, for example, to access network content served up by the computing environment 103 and/or other servers, thereby rendering a customer user interface 181 on the customer display 174. To this end, the customer client application 171 may comprise, for example, a browser, a dedicated application, etc., and the customer user interface 181 may comprise a network page, an application screen, etc. The customer client 107 may be configured to execute applications beyond the customer client application 171 such as, for example, email applications, social networking applications, word processors, spreadsheets, and/or other applications.

Next, a general description of the operation of the various components of the networked environment 100 is provided. To begin, users at the customer client 107 may observe performances, on the customer display 174 through a customer user interface 181, on another device capable of displaying performances, such as, for example, a television, or in person at a live event. Performances may be, for example, awards shows, news shows, sports events, television shows, movies, commercials, concerts, or other events observed by people.

Prior to the performance, collections 124 of items 127 related to subjects 131 that are expected to appear in the performance have been defined. Subjects 131 may be, for instance, people, animals, clothes, vehicles, furniture, or other objects seen in performances. Collections 124 may include any related items 127, such as, for example, jewelry and clothes worn by a person or similar to those worn by a person, accessories depicted on a vehicle and/or the vehicle itself, furniture decorating a home, or other items related to subjects seen in performances. The items may have been input by a user at an administrator client device 105 and/or selected from the item catalog 121.

When watching a performance, the user at the administrator client 105 initiates an administrator client application 164 that establishes a connection with the item collection system 115. The administrator client application 164 is configured to present input components to users at the administrator client 105 so that the user may provide an indication when a new subject has appeared in a performance and what items 127 should be included in the collection. Also, the user at the customer client 107 initiates a customer client application 171 that establishes a connection with the item collection system 115. The customer client application 171 obtains a list of performances being viewed by the user and sends this list to the item collection system 127. The customer client application 171 is configured to present collections 124 of items 127 to users so that the user may select collections 124 and/or items 127 associated with the subjects in the performance(s) and perform actions, such as, for example, purchase the collections 124 and/or items 127.

During the performance, the item collection system 115 may receive input from a user at an administrator client 105 through a selection in an administrator user interface 177 that indicates a particular subject has appeared in the performance. In various embodiments, this input may also come from a customer client 107. Alternatively, the item collection system 115 may perform subject detection to identify a subject upon appearance in the performance corresponding to subject 131 in the data. When the subject appears, the item collection system 115 may send the collection 124 or some selection of items 127 in the collection 124 to the customer client 107 for display in a collection display panel to the user at the customer client 107. The collection display panel depicts collections 124 related to some or all subjects 131 seen in the performance. The collection display panel allows the user to navigate to previous collections and interact with those items while still updating with new collections received from the item collection system 115. Additionally, the collection display panel may appear in a portion of the display on which the performance media is rendered or on a separate device.

Once the items are displayed, the user at the customer client 107 may select an item or items for further action. For example, the user may seek to purchase the item, add the item to a wish list, learn more about the item, or perform some other action related to items. The item collection system 115 may store the time since the beginning of the performance at which the subject was seen in the performance in the data store 112 as an timestamp 134 so that the collection 124 may be viewed at the same time as the subject appears during replay without performing subject detection or otherwise requiring input of when the subject appears.

As a non-limiting example, a viewer of the evening news on a television may have a cellphone as a customer client 107 that has a customer display 174 with a customer user interface 181 depicting a collection display panel. In other embodiments, the collection display panel may be depicted as a sidebar on the television at the top, bottom, side, or other area of the screen. Prior to the evening news, it is assumed that a collection 124 has been stored in the data store 112 for the news anchor subject 131 that includes items 127, such as a BrandA necklace, BrandA earrings, BrandB blazer, BrandC pants, and BrandD shoes.

Continuing the non-limiting example, when the news anchor appears on the evening news, the item collection system 115 performs subject detection to detect the presence of the subject. The subject may be detected by an input from an administrator indicating the presence of the subject or by automated subject detection. The subject may be identified as the news anchor by input from the administrator or by subject recognition. Subject recognition may comprise facial recognition algorithms or other recognition systems. In various embodiments, the item collection system 115 may recognize the subject as the exact news anchor. Alternatively, the item collection system 115 may provide a narrowed list of subjects 131 to the administrator client 105 for display in an administrator user interface 177 of subjects expected to appear in the evening news for the administrator to select the news anchor.

Continuing the non-limiting example, once the item collection system 115 has identified the subject 131 as the news anchor, it obtains the collection 124 associated with the news anchor from the data store 112. It may obtain a selection of certain items 127 in the collection 124 from the administrator client 124, depending on what the news anchor is wearing or other criteria for which items to include in the collection 124 sent to the customer client 107. In various embodiments, the item collection system 115 may identify the collection associated with the news anchor based on the collection 124 in the data store 112. The collection is sent to the customer client 107 for display in the collection display panel customer user interface 181.

Because there may be many subjects in a performance, the collection display panel may still depict the collection for the weather forecaster, with the news anchor's collection added to the left, right, above, or below the weather forecaster's collection. To navigate between many collections, the user may scroll, click a navigation input, or otherwise change the view of the collection display panel to see other collections. For example, the user may scroll through previously rendered collections by clicking a navigation arrow in a user interface to view collections to the left, right, above, or below the collection or collections currently visible. In other examples, the user may shift the focus of the display to another area to navigate to other collections.

Continuing the non-limiting example, the viewer at customer client 107 may select the earrings in the collection display panel by touching the customer display 174 for a touch screen device by manipulating a cursor or performing some other action to select an item. Once selected, the item collection system 115 may initiate a purchase of the earrings by communicating with the electronic commerce system 116 to add the earrings to a shopping cart based on the viewer's preference. Alternatively, in various embodiments, the item collection system 115 may communicate with the electronic commerce system 116 or itself add the earrings to a wish list, display a network page depicting details about the earrings, or perform some other action.

In an alternative embodiment, the performance may be a live event without a broadcast to remote locations. For example, the performance may be a music concert, theatre play, football game, or other live performance with attendees in an audience. In this embodiment, the user at the administrator client 105 is an observer at the performance present at the performance to provide an indication of when a new subject appears in the performance. For example, at a Rolling Stones concert, the user at the administrator client 105 may indicate when Mick Jagger appears on stage at the concert. The administrator client 105 may be any device present at the performance. The administrator client 105 depicts the administrator user interface 177, but not the performance because the performance is a live event not currently broadcast.

In various embodiments, the administrator client 105 may automatically obtain an indication of which subject is currently viewed in the performance. For example, instead of a user providing an input, the administrator client 105 would take a picture that would be used to perform subject recognition. An administrator client application 164 may perform subject recognition or the automatically obtained indication may be sent to the item collection system 115 to perform subject recognition. Continuing the concert example, when Mick Jagger appears in the performance, the administrator client 105 takes a picture of Mick Jagger and sends the picture to the item collection system 115 across the network 109.

The customer client 107 depicts the collection display panel, but not the performance. The user at the customer client 107 may be present at the performance or elsewhere. Continuing the concert example, the customer may be a huge fan of Mick Jagger and seek to view collections of items related to Mick Jagger's performance whatever he is on stage. Thus the customer views the collection display panel customer user interface 181 to observe collections related to Mick Jagger during his performances, even if the customer is not present at the performance. Alternatively, the customer may be present at the performance and viewing the same subjects as the user at the administrator client 105.

Upon an indication of the new subject in the performance at the administrator client 105, the item collection system 115 obtains the indication and associates the collection with the new subject. The collection can be predetermined and sent to a client when the subject appears or it may be determined based on analysis of an indication obtained from the administrator client 105. For example, item collection system 115 may obtain the picture from the administrator client 105 and automatically recognize the subject and the collection. Continuing the concert example, if Mick Jagger is wearing leather pants and a red shirt, the item collection system may recognize and select a collection 124 of leather pants and a red shirt to be sent to the customer client 107 for display in the collection display panel customer user interface 181. Alternatively or in addition, the item collection system 115 may obtain a predetermined collection 124 from the data store 112 associated with Mick Jagger. The collection is then sent to the customer client 107 for display in the collection display panel customer user interface 181.

Figure 2A:
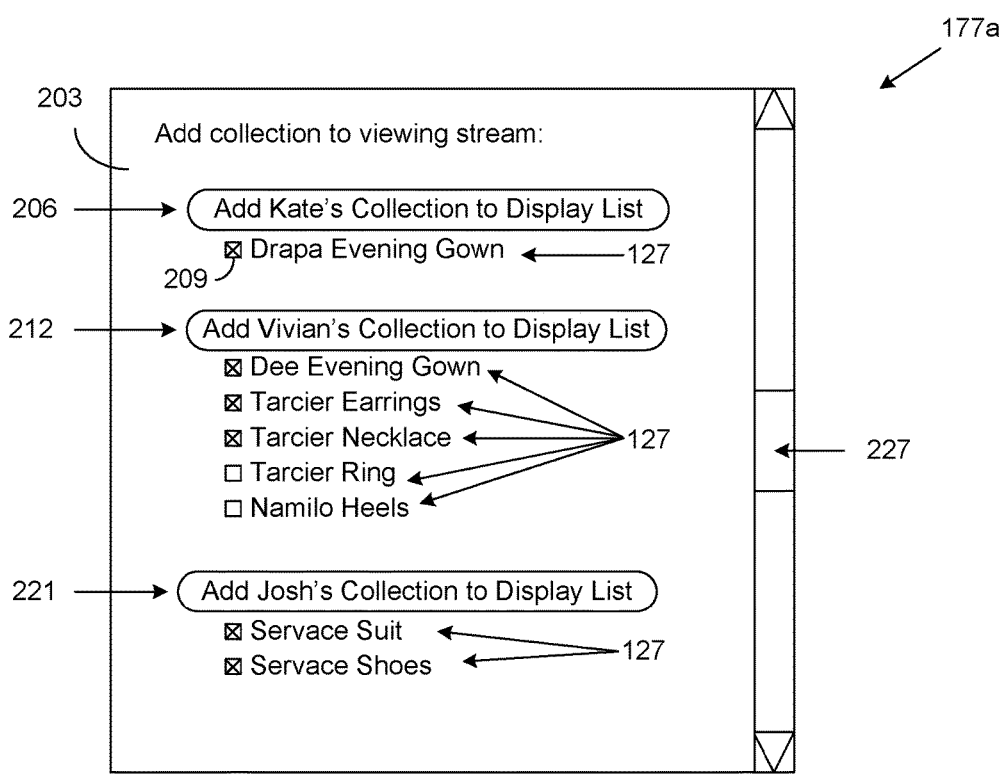
FIGS. 2A, 2B, 2C, 2D, and 2E are drawings of examples of a user interface rendered by a client in the networked environment of FIG. 1 according to various embodiments of the present disclosure.

Turning now to FIG. 2A, shown is one example of an administrator user interface 177, denoted herein as an administrator user interface 177a, rendered by an administrator client application 164 (FIG. 1) executed in an administrator client 105 (FIG. 1) in the networked environment 100 (FIG. 1) according to an embodiment of the present disclosure. The administrator user interface 177a includes a network page 203 depicting collections that may be selected to add to be rendered in a collection display panel. The network page 203 provides an input component 206 for the user of the administrator client 105 to indicate when Kate appears in the performance. For example, when Kate appears in a live performance, the user may click the input component 206. In various embodiments, the user may indicate the initial appearance of the subject and then stop or continue to indicate the presence of the subject until the subject no longer appears in the performance. Each of the input components 206, 212, and 221 may be selected multiple times if the subject associated with that collection appears repeatedly during the performance.

The user's indication may be obtained by the item collection system 115 (FIG. 1) across the network 109 as a trigger to send the collection to a customer client for inclusion in the collection display panel. The network page 203 also provides an input component 209 for the user to indicate whether to include the evening gown item in the collection. It is assumed that the evening gown was identified as part of Kate's collection 124 (FIG. 1) as an item 127 (FIG. 1) prior to the performance. Similarly, the network page 203 provides an input component 212 for indicating when to add Vivian's collection to the collection display panel. In this example depiction, the user deselected the Tarcier Ring and Namilo Heels items 127 to indicate that they should not be included in the collection and selected the Dee Evening Gown, Tarcier Earrings, and Tarcier Necklace items 127 to indicate that they should be included in the collection. Once a subject has appeared, the item collection system 115 may then store the user's selections from the items 127 in the data store 112 (FIG. 1).

Continuing with FIG. 2A, the network page 203 provides a scrolling input 227 for the user to browse to other collections for indicating that other subjects have appeared. The collections associated with Kate, Vivian, and Josh are currently displayed, but the user may select the scrolling input 227 to navigate to other collections. In various embodiments, this ability may comprise other mechanisms of moving between collections, such as, for example, swiping across the screen, hovering an input device at a certain location or locations on the screen, or other input methods that indicate a desire to move to other collections available for depiction. Finally, in various embodiments, the collections available for selection may be determined by the item collection system 115 (FIG. 1) based on an automated subject recognition analysis of the performance. For example, the item collection system 115 may narrow the available collections 124 to a select number of subjects 131 that could be the subject appearing in the performance.

Figure 2B:
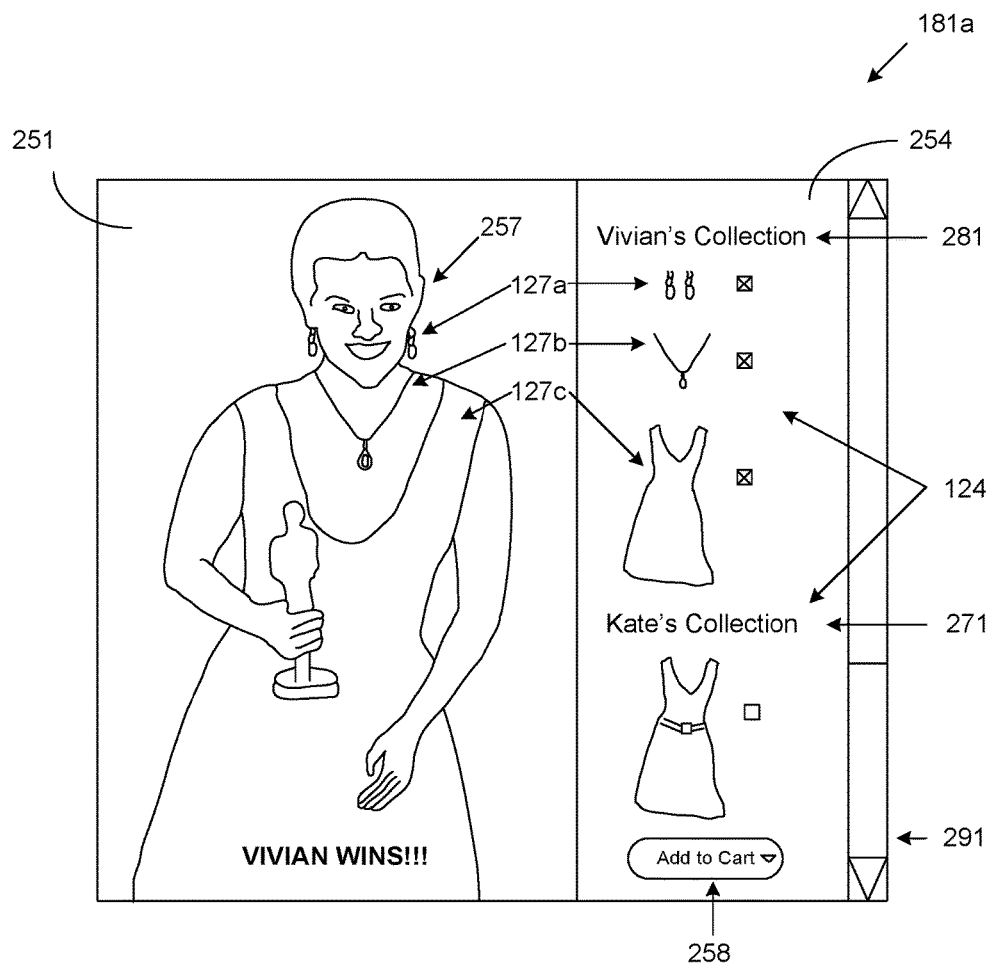

Moving on to FIG. 2B, shown is one example of a customer user interface 181, denoted herein as customer user interface 181a, rendered by a customer client application 171 (FIG. 1) executed in an customer client 107 (FIG. 1) in the networked environment 100 (FIG. 1) according to an embodiment of the present disclosure. The customer user interface 181a includes a network page 251 depicting the performance. The customer user interface 181a also includes a collection display panel 254 displaying the collections 124 associated with subjects 131 (FIG. 1) Kate and Vivian who have appeared in the performance seen in the network page 251. When Kate appeared in the performance, the user indicated that she was wearing a dress by selecting the dress indicator 209 (FIG. 2A). The item collection system 115 (FIG. 1) obtained the collection 124 and dress item 127 associated with Kate as a subject 131 from the data store 112 to send to the customer client 107 to add to the collection display panel 254.

Continuing with FIG. 2B, currently on screen in the performance is the subject 257 Vivian. Seen on Vivian are items 127 (FIG. 1) including earrings 127a, a necklace 127b, and a dress 127c. During Vivian's appearance in the performance, the item collection system 115 obtained the indicator of Vivian's appearance from the input component 206 (FIG. 2A) and sent the collection 124 associated with Vivian as a subject 131 to the customer client 107 to add to the collection display panel 254. Alternatively, Vivian's appearance in the performance may have been detected by the item collection system 115 by automated subject recognition. The collection 124 also includes items 127 ring and heels but since the items were not selected in the network page 203 (FIG. 2B) using the corresponding indicators, the item collection system 115 did not send those items 127 to the customer client 107. Corresponding to these worn by Vivian is Vivian's collection 281 consisting of earrings 127a, a necklace 127b, and a dress 127c. The collection 281 may be the exact items worn by Vivian or ones similar to the items worn by Vivian, as predefined in the data store 112 (FIG. 1) in collection 124 (FIG. 1) and items 127 (FIG. 1). The user may select the collections 271 and 281 and/or the individual items 127 in the collections to perform actions 258, such as, for example, purchasing the collections and/or items, adding the items and/or collections to a list, or other action.

Continuing with FIG. 2B, the user may select the scroll bar 291 to navigate to other collections 124 (FIG. 1) related to subjects 131 (FIG. 1) who have previously been viewed in the performance in the network page 251. In various embodiments, the collection display panel 254 may allow for navigation in other ways, such as, for example, swiping the screen, hovering or selecting a navigational input, or other way of navigating between collections depicted in the collection display panel 254.

Figure 2C:
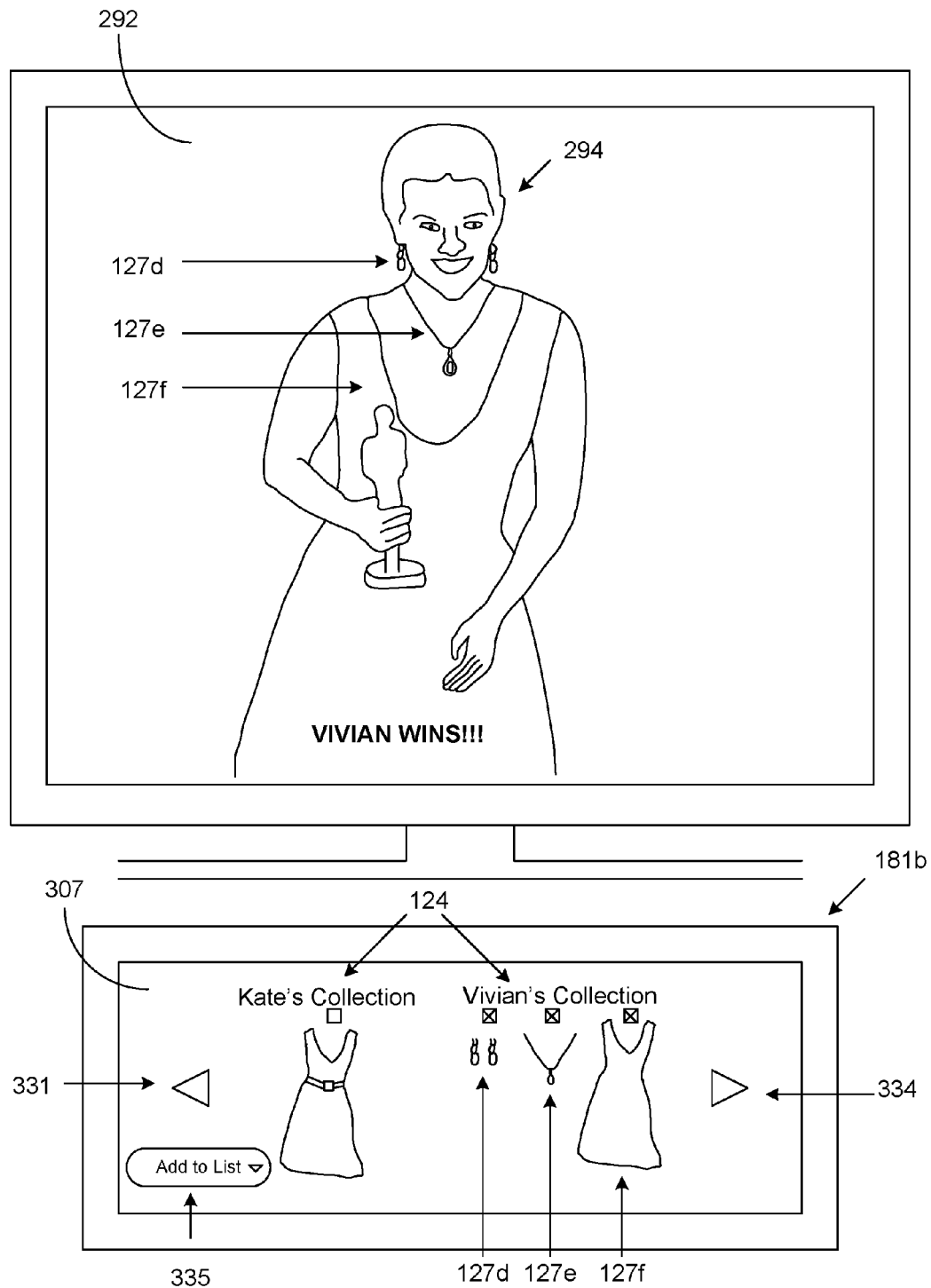

Referring next to FIG. 2C, shown is one example of a customer user interface 181, denoted herein as customer user interface 181*b*, rendered by a customer client application 171 (FIG. 1) executed in an customer client 107 (FIG. 1) in the networked environment 100 (FIG. 1) according to an embodiment of the present disclosure. The customer user interface 181*b* includes a collection display panel 307 displaying the collections 124 associated with subjects 131 (FIG. 1) Kate and Vivian who have appeared in the broadcast 292. Also shown is a broadcast 292 depicting the performance in a display separate from the collection display panel 307. The subject 294 Vivian is shown in the broadcast 292 wearing items 127 (FIG. 1) including earrings 127*d*, a necklace 127*e*, and a dress 127*f*. Therefore, the item collection system 115 (FIG. 1) sent Vivian's collection 124 to the collection display panel 307 to display the collection 124 with earrings 127*d*, a necklace 127*e*, and a dress 127*f* that relate to or are the same as the items 127 worn by Vivian. The items 127 seen as part of the collection 124 in the collection display panel customer user interface 181*b* were defined prior to the performance and stored as a collection 124 and items 127. The collection display panel customer user interface 181*b* provides the user the ability to navigate to other collections by selecting the arrow inputs 331 and 334. The user may select items 127 and collections 124 in the collection display panel and then perform an action 335 with the item, such as, for example, adding the items and/or collections to a list, viewing detail pages about the items and/or collections, purchasing the items and/or collections, or other action.

Figure 2D:
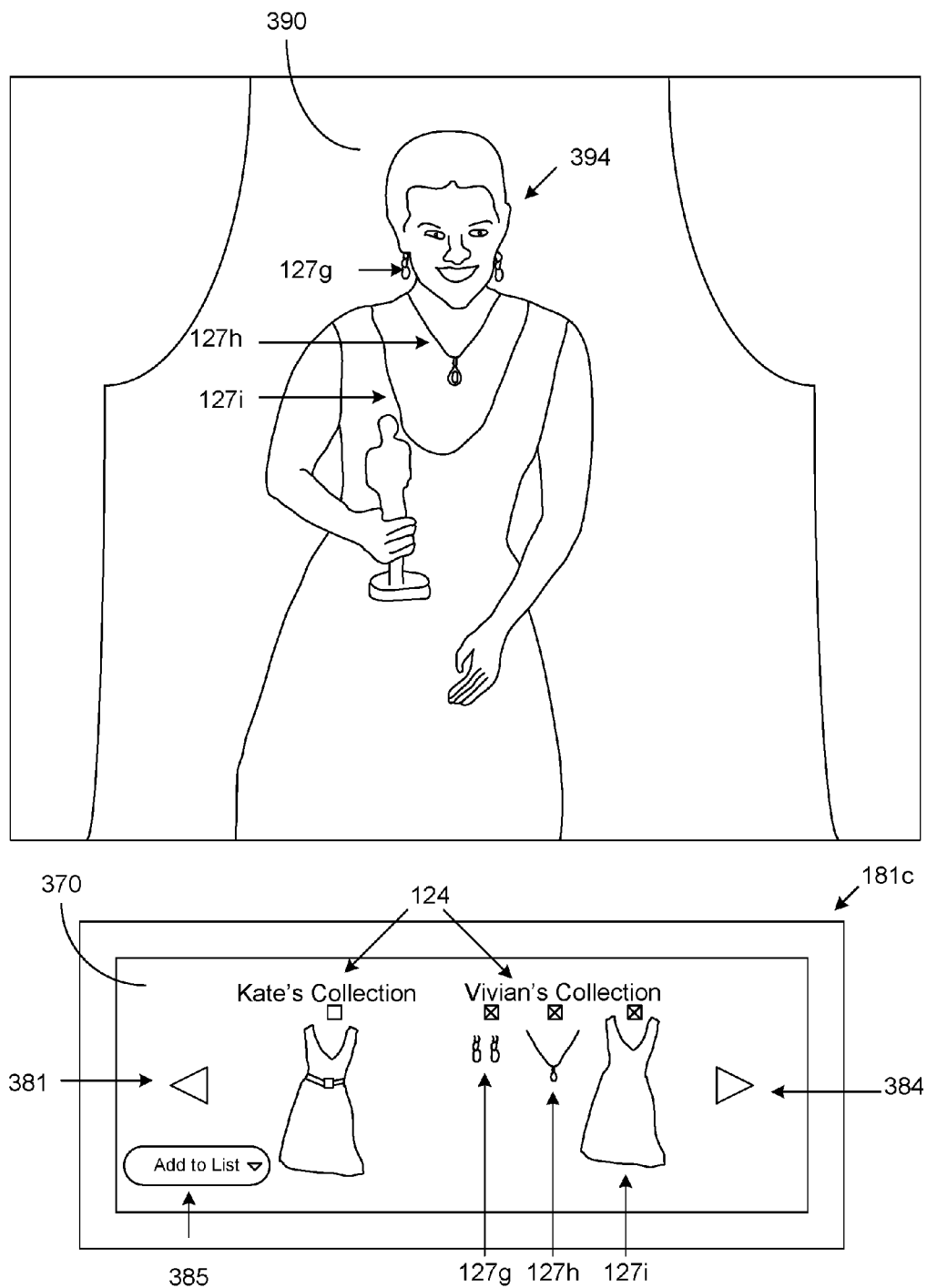

Referring next to FIG. 2D, shown is one example of a customer user interface 181, denoted herein as customer user interface 181*c*, rendered by a customer client application 171 (FIG. 1) executed in an customer client 107 (FIG. 1) in the networked environment 100 (FIG. 1) according to an embodiment of the present disclosure. The customer user interface 181*c* includes a collection display panel 370 displaying the collections 124 associated with subjects 131 (FIG. 1) Kate and Vivian who have appeared in the live performance 390. Also shown is a performance 390 depicting the performance in real life. The subject 394 Vivian is shown in the live performance 390 wearing items 127 (FIG. 1) including earrings 127*g*, a necklace 127*h*, and a dress 127*i*. Therefore, the item collection system 115 (FIG. 1) sent Vivian's collection 124 to the collection display panel 370 to display the collection 124 with earrings 127*g*, a necklace 127*h*, and a dress 127*i* that relate to or are the same as the items 127 worn by Vivian. The items 127 seen as part of the collection 124 in the collection display panel customer user interface 181*c* were defined prior to the performance and stored as a collection 124 and items 127. The collection display panel customer user interface 181*c* provides the user the ability to navigate to other collections by selecting the arrow inputs 381 and 384. The user may select items 127 and collections 124 in the collection display panel and then perform an action 385 with the item, such as, for example, adding the items and/or collections to a list, viewing detail pages about the items and/or collections, purchasing the items and/or collections, or other action.

Figure 2E:
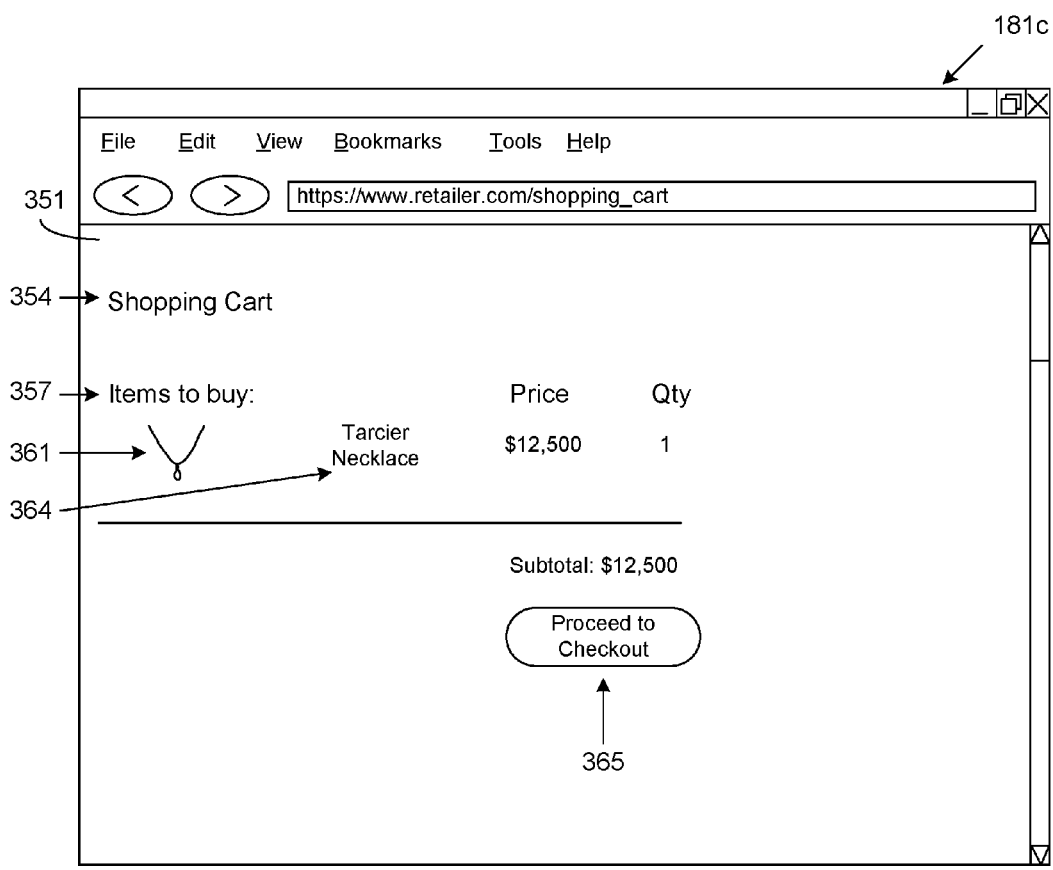

Turning now to FIG. 2E, shown is one example of a customer user interface 181, denoted herein as customer user interface 181*c*, generated in part by an electronic commerce system 116 (FIG. 1) to be rendered in a customer client 107 (FIG. 1) in the networked environment 100 (FIG. 1) according to an embodiment of the present disclosure. The customer user interface 181*c* comprises a network page 351 providing a view of a shopping cart 354 where the user has selected the necklace item 127*b* (FIG. 2B) or necklace item 127*e* (FIG. 2C) in a collection display panel to purchase. As a result, a necklace 361 from the item catalog 121 (FIG. 1) has been added to the items to buy list 357. The Tarcier Necklace 364, as opposed to another brand or style of necklace, was added to the cart based on the item 127 (FIG. 1) added to the collection 124 (FIG. 1) prior to the performance. From there, the electronic commerce system 116 may facilitate the purchase pipeline once the user selects to proceed to checkout 365.

Figure 3A:
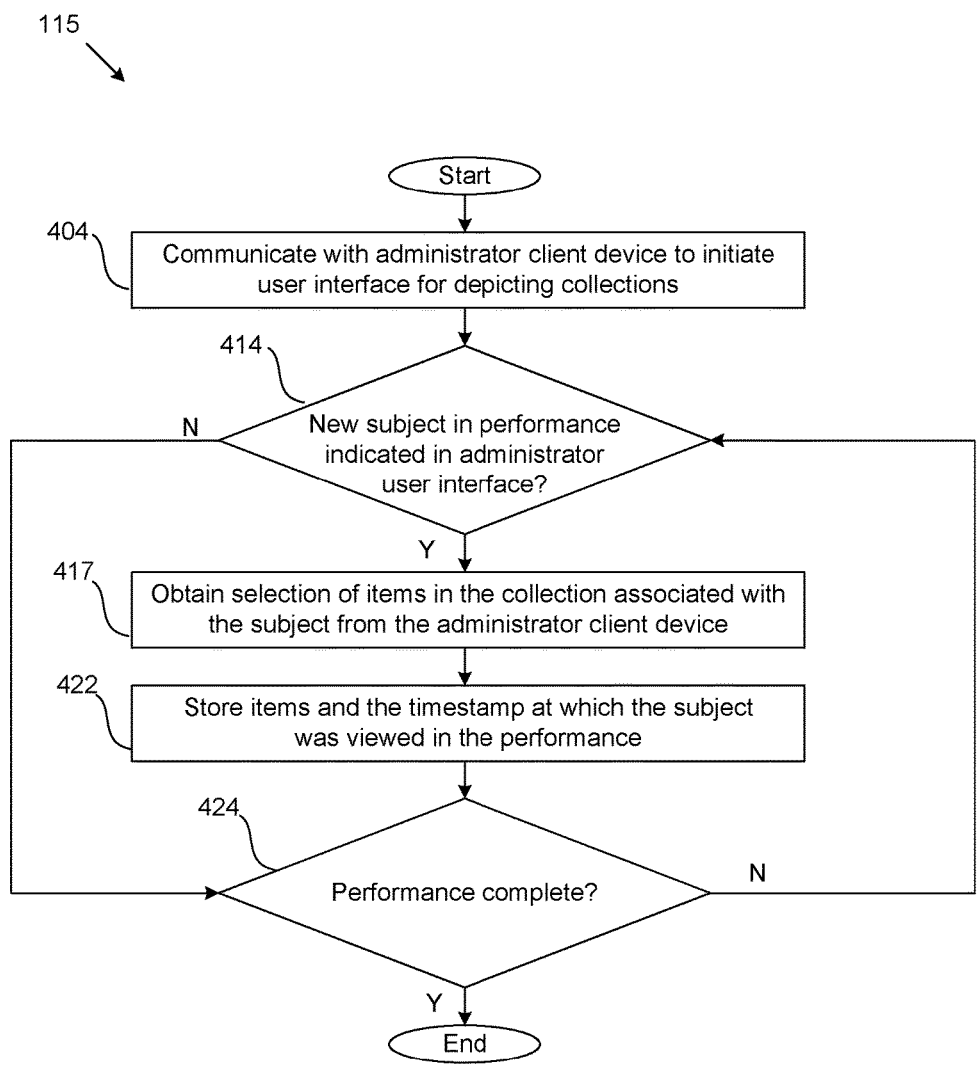
FIGS. 3A, 3B, and 3C are flowcharts illustrating examples of functionality implemented as portions of item collection system 115 executed in a computing environment in the networked environment of FIG. 1 according to various embodiments of the present disclosure.

Referring next to FIG. 3A, shown is a flowchart that provides one example of the operation of a portion of the item collection system 115 according to various embodiments. It is understood that the flowchart of FIG. 3A provides merely an example of the many different types of functional arrangements that may be employed to implement the operation of the portion of the item collection system 115 as described herein. As an alternative, the flowchart of FIG. 3A may be viewed as depicting an example of steps of a method implemented in the computing environment 103 (FIG. 1) according to one or more embodiments.

The flowchart of FIG. 3A provides an example of the item collection system 115 detecting the appearance of subjects in performances through an indication in an administrator user interface 177 (FIG. 1) rendered in an administrator client 105 (FIG. 1). The user at the administrator client 105 provides an indication by, for example, clicking an input component while the subject appears in the performance. The item collection system 115 uses this indication as a trigger for timestamping when the subject appears and for when to send a collection 124 (FIG. 1) to a customer client device 107 (FIG. 1) for display in a collection display panel.

Beginning in box 404, the item collection system 115 communicates with the administrator client 105 to initiate a user interface. The user interface depicts predefined collections 124 (FIG. 1) associated with subjects 131 (FIG. 1) expected to be viewed in a performance. The performance may be, for example, an awards show, news broadcast, television show, movie, commercial, or any event observed by viewers. The subjects 131 may be people, animals, vehicles, buildings, or other objects often viewed in performances. The collections may have been defined by a merchant, manufacturer, performance representative, stylist, or other individual who knows what subjects will be seen in the performance and what items 127 (FIG. 1) will be associated with those seen in connection with the subject. The user of the administrator client device indicates when a new subject appears in the performance. The user may be the same as the user of a customer client device 107 if the administrator and customer is the same individual. For example, an individual observing an awards show may indicate, in the user interface, that a certain actor has appeared on the screen to accept an award. That same individual may also be a customer if the individual uses the collection display panel user interface to select an item in the collection related to the actor for purchase.

The user at the administrator device may view the performance through a device. Alternatively, the user may be present at the location of the performance. For example, in the case of a music concert, the user may be an attendee at the concert, or the user may be viewing the concert from another location through a device, such as through a computer. In either situation, the user at the administrator has an administrator client device 105 through which the user may indicate in an administrator user interface 177 that a new subject has appeared in the performance.

In box 414, the item collection system 115 evaluates whether a new subject has appeared in the performance based on whether a message was received from the administrator client 105 indicating that there has been a corresponding indication input manipulated in the administrator user interface 177 (FIG. 1). Upon receipt of the message indicating a new subject has appeared, the item collection system 115 obtains the selection of items in the collection associated with the subject from the administrator client device in box 417. In various embodiments, the item collection system 115 may obtain a message from the administrator client 105 comprising a selection in the administrator user interface 177 indicating all of the collection 124 (FIG. 1) should be presented to the customer or just some items 127.

For example, if a newscaster appears wearing all of the items in the collection that was defined prior to the newscast by the merchant, then the administrator may click a button in the administrator user interface to display the whole collection associated with the newscaster to a customer. But if the newscaster does not wear a ring expected to be seen, the administrator may unselect the ring and only indicate the remainder of the items should be displayed to the customer. Alternatively, the item collection system 115 may show the entire selection without requiring the selection of items 127 by the administrator client. If a new subject has not appeared in the performance, then the item collection system 115 continues to box 424.

In box 422, the item collection system 115 stores the items selected by the administrator as appearing in the performance and the timestamp at which the subject associated with the items appeared in the performance in the data store 112 (FIG. 1). This facilitates replaying the performance in the future and adding collections to the collection display panel at the time or soon thereafter when the subject appears in the performance without the need for an administrator indicating the appearance.

In box 424, the item collection system 115 evaluates whether the performance is complete. If it is not, it returns to box 414 to continue to evaluate whether new subjects have appeared and to add the collections to the collection display panel. If the performance has ended, thereafter, this portion of the item collection system 115 ends.

Figure 3B:
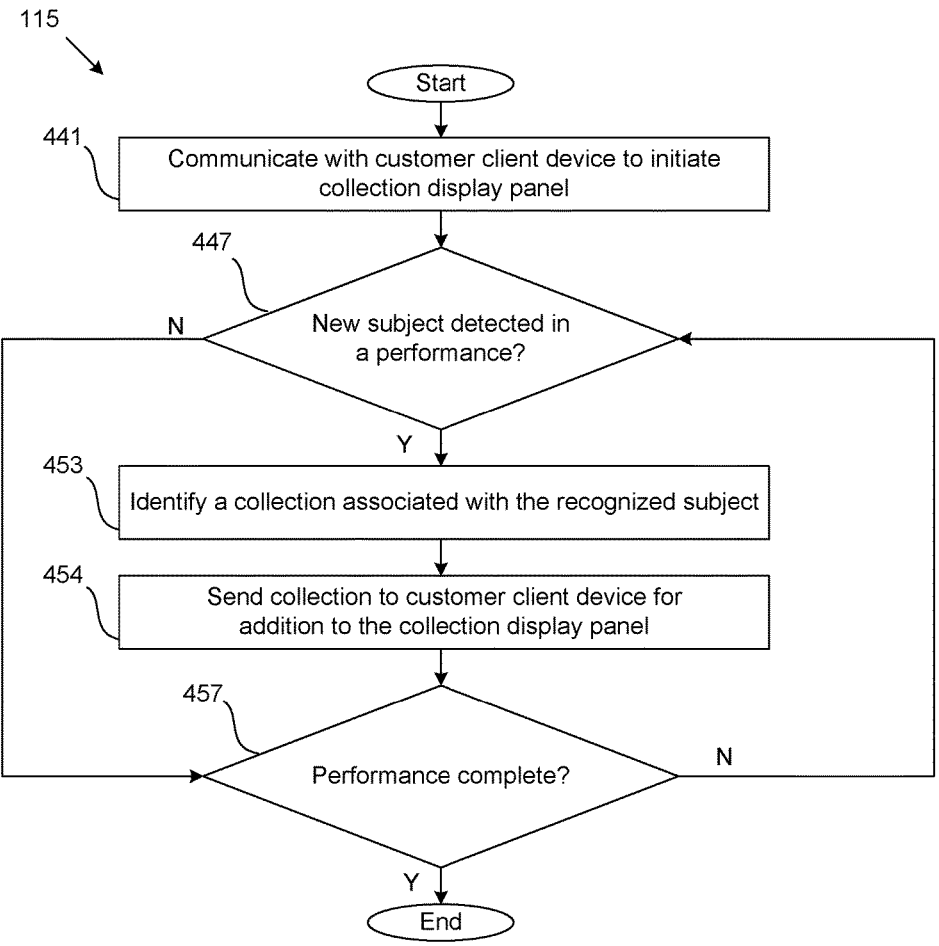

Referring next to FIG. 3B, shown is a flowchart that provides one example of the operation of another portion of the item collection system 115 according to various embodiments. It is understood that the flowchart of FIG. 3B provides merely an example of the many different types of functional arrangements that may be employed to implement the operation of the portion of the item collection system 115 as described herein. As an alternative, the flowchart of FIG. 3B may be viewed as depicting an example of steps of a method implemented in the computing environment 103 (FIG. 1) according to one or more embodiments.

The flowchart of FIG. 3B depicts the steps of sending collections 124 (FIG. 1) to a customer client 107 (FIG. 1) upon detection of a new subject 131 (FIG. 1) in a performance for rendering in a collection display panel user interface 182 (FIG. 1). The collection display panel user interface 182 is rendered in a customer client 107 for display to a customer upon appearance of a subject 131 in performances being viewed by the customer. Either prior to viewing or while viewing performances, the user at the customer client 107 initiates a customer client application 171 (FIG. 1) that establishes a connection with the item collection system 115 and identifies the performances being viewed.

Beginning with box 441, the item collection system 115 communicates with the customer client 107 device to initiate rendering the collection display panel in response to the customer client 107 registering with the item collection system 115. In box 447, the item collection system 115 evaluates whether a new subject 131 has been detected in a performance. Subject detection may be done in a variety of ways. One way to detect a subject may be through an administrator's input in an administrator client 105 (FIG. 1). The input may be generated by, for example, the user of the administrator client 105 clicking an input in a user interface, selecting an input in the user interface for the length of time that the subject is on the screen, as described above, or other input through the administrator client 105.

Another way the item collection system 115 may detect a subject may be through subject recognition. Subject recognition may comprise, for example, facial recognition, object recognition, or other algorithm that identifies the detected subject as a subject 131. For example, the item collection system 115 may compare the characteristics of the detected subject to subjects 131 to identify which subject 131 is appearing in the performance. If a new subject has not been detected in the performance, then the item collection system 115 continues to box 457.

In box 453, the item collection system 115 identifies the collection 124 (FIG. 1) associated with the recognized subject 131. It is assumed that the collection 124 was previously defined and stored in the data store 112 (FIG. 1). The collection 124 may have been defined by an individual familiar with the subjects 131 (FIG. 1) expected to appear in the performance, by the administrator using the administrator client 105, or other entity with knowledge of collections 124 associated with subjects 131 appearing in the performance.

In box 454, the item collection system 115 sends the collection 124 to the collection display panel customer user interface 181 for display to a customer. It is assumed that the customer client application 171 was initialized and interacting with the item collection system 115 to generate the collection display panel customer user interface 181 and to render items 127 thereon.

In box 457, the item collection system 115 evaluates whether the performance is complete. If not, it returns to box 447 to continue to detect subjects and add collections associated with the subjects to the collection display panel. This portion of the item collection system 115 ends thereafter.

Figure 3C:
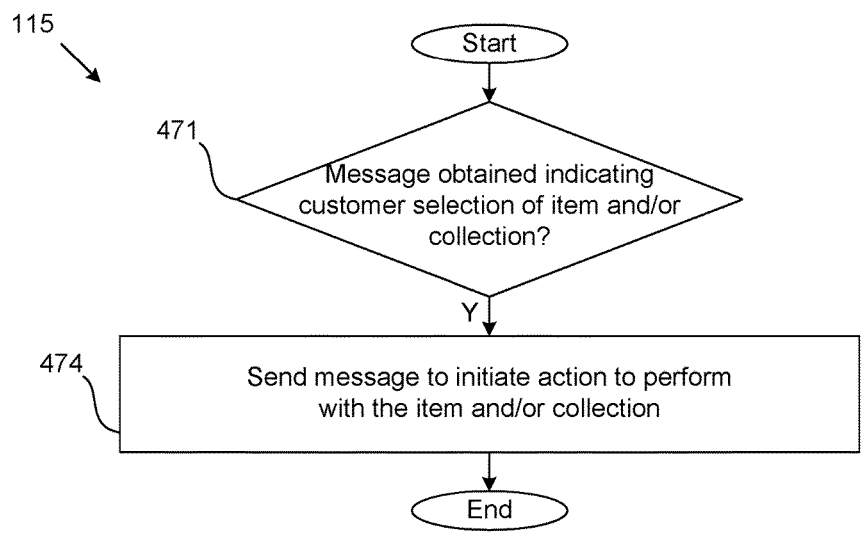

Referring next to FIG. 3C, shown is a flowchart that provides one example of the operation of a portion of the item collection system 115 according to various embodiments. It is understood that the flowchart of FIG. 3C provides merely an example of the many different types of functional arrangements that may be employed to implement the operation of the portion of the item collection system 115 as described herein. As an alternative, the flowchart of FIG. 3C may be viewed as depicting an example of steps of a method implemented in the computing environment 103 (FIG. 1) according to one or more embodiments.

The flowchart of FIG. 3C depicts how the item collection system 115 enables performing actions upon customer selection of items 127 (FIG. 1) in the collection display panel customer user interface 181 (FIG. 1) on the customer client 107.

Beginning with box 471, the item collection system 115 obtains a message from the customer client 107 (FIG. 1) indicating that a customer has selected an item and/or collection within in the collection display panel customer user interface 181. It is assumed that the customer client 107 has initialized communications with the item collection system 115 previously to facilitate this message.

In box 474, the item collection system initiates an action to perform with the item and/or collection. Actions may be, for example, displaying an item detail page related to the item selected, a purchase, adding the item to a wish list or other list, or other action. The item collection system 115 initiates the action by sending a message to an appropriate system or by performing the action itself. For example, the item collection system 115 may send a message to the electronic commerce system 116 (FIG. 1) to initiate the purchase or to generate an item detail network page for rendering in the customer client 107. Alternatively, the manipulation of an input component may send a request directly to the electronic commerce system 116 or other system for action. This portion of the item collection system 115 ends thereafter.

Figure 4:
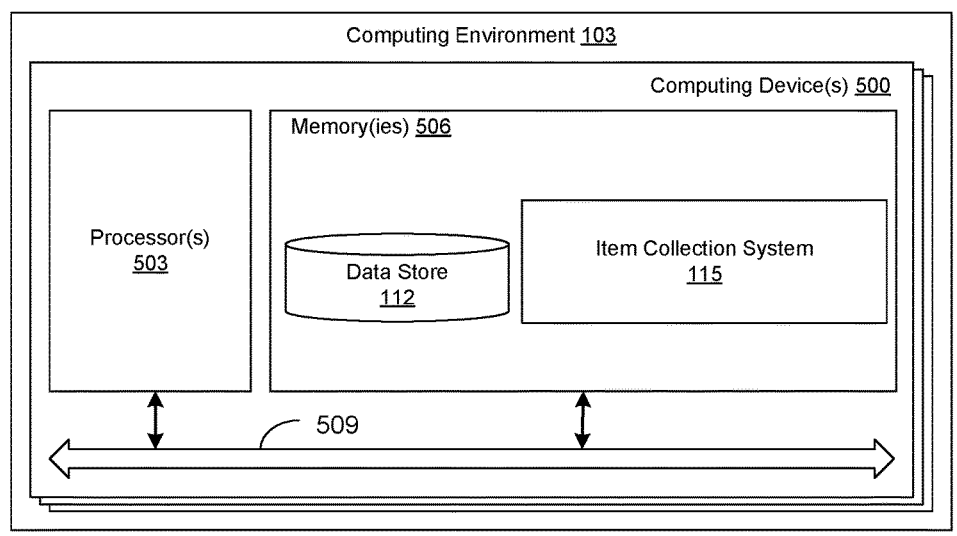
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are item collection system 115, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although item collection system 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A, 3B, and 3C show the functionality and operation of an implementation of portions of the item collection system 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3A, 3B, and 3C show a specific order of execution, it is understood that the order of execution may differ from that which is depicted. For example, the order of execution of two or more blocks may be scrambled relative to the order shown. Also, two or more blocks shown in succession in FIGS. 3A, 3B, and 3C may be executed concurrently or with partial concurrence. Further, in some embodiments, one or more of the blocks shown in FIGS. 3A, 3B, and 3C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including item collection system 115, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   obtain an indication of a subject appearing in a broadcast;
   detect a depiction of the subject in the broadcast by applying a subject recognition algorithm to video data of the broadcast;
   identify a collection of at least one of a plurality of items associated with the subject in response to detecting the depiction of the subject in the broadcast; and
   communicate an indication of the collection of items to a client device associated with a viewer of the broadcast.

2. The non-transitory computer-readable medium of claim 1, wherein the subject recognition algorithm comprises a facial recognition algorithm.

3. The non-transitory computer-readable medium of claim 1, wherein the program further causes the at least one computing device to at least:
   obtain at least one image associated with the subject; and
   wherein the subject recognition algorithm is applied to the video data of the broadcast as a function of the at least one image.

4. A system, comprising:
   at least one computing device configured to at least:
   obtain an indication of a subject appearing in a broadcast;
   detect a depiction of the subject in the broadcast by applying a subject recognition algorithm to video data of the broadcast;
   identify a collection of at least one of a plurality of items associated with the subject in response to detecting the depiction of the subject in the broadcast; and
   communicate an indication of the collection of items to a client device associated with a viewer of the broadcast.

5. The system of claim 4, wherein the at least one computing device is further configured to at least generate an administrator user interface facilitating obtaining the indication of the subject.

6. The system of claim 4, wherein the at least one computing device is further configured to at least:
   obtain a selection of at least one of the items in the collection; and
   perform at least one of a plurality of actions based on the selection.

7. The system of claim 6, wherein the at least one of the plurality of actions comprises initiating a purchase of the at least one of the items corresponding to the selection.

8. The system of claim 6, wherein the at least one of the plurality of actions comprises adding the at least one of the items to an item list.

9. The system of claim 4, wherein the collection is one of a plurality of collections associated with the subject, and at least one computing device is further configured to at least encode for rendering a user interface facilitating a navigation of the plurality of collections by the client device.

10. The system of claim 4, wherein the client device is a first display device and the video data of the broadcast is rendered in a second display device.

11. The system of claim 4, wherein the video data of the broadcast is rendered by the client device.

12. The system of claim 4, wherein the subject recognition algorithm comprises a facial recognition algorithm.

13. The system of claim 4, wherein the at least one computing device is further configured to at least:
obtain at least one image associated with the subject; and
wherein the subject recognition algorithm is applied to the video data of the broadcast as a function of the at least one image.

14. A method, comprising:
obtaining, by at least one computing device, an indication of a subject appearing in a broadcast;
detecting, by the at least one computing device, a depiction of the subject in the broadcast by applying a subject recognition algorithm to video data of the broadcast;
identifying, by the at least one computing device, a collection of at least one of a plurality of items associated with the subject in response to detecting the depiction of the subject in the broadcast; and
communicating, by the at least one computing device, an indication of the collection of items to a client device associated with a viewer of the broadcast.

15. The method of claim 14, further comprising:
obtaining, by the at least one computing device, a selection of at least one of the items in the collection; and
performing, by the at least one computing device, at least one action based on the selection.

16. The method of claim 14, wherein the subject recognition algorithm comprises a facial recognition algorithm.

17. The method of claim 14, further comprising:
obtaining, by the at least one computing device, at least one image associated with the subject; and
wherein the subject recognition algorithm is applied to the video data of the broadcast as a function of the at least one image.

18. The method of claim 14, wherein the collection is one of a plurality of collections associated with the subject, and the method further comprises encoding for rendering a user interface facilitating a navigation of the plurality of collections by the client device.

19. The method of claim 14, further comprising:
obtaining, by the at least one computing device, a selection of at least one of the items in the collection; and
performing, by the at least one computing device, a plurality of actions based on the selection.

20. The method of claim 19, wherein the plurality of actions comprises at least one of: adding the at least one of the items to a wish list, adding the at least one of the items to a shopping cart or initiating display of an item detail page related to the at least one of the items.

* * * * *